(12) United States Patent
Chomsky et al.

(10) Patent No.: US 9,514,483 B2
(45) Date of Patent: Dec. 6, 2016

(54) MARKETING CAMPAIGN APPLICATION FOR MULTIPLE ELECTRONIC DISTRIBUTION CHANNELS

(71) Applicant: American Express Travel Related Services Company, Inc., New York, NY (US)

(72) Inventors: Mara K. Chomsky, Hoboken, NJ (US); David M. Greenspan, Staten Island, NY (US); Randi Schochet, New York, NY (US); Elizabeth K. Vakil, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 13/926,789

(22) Filed: Jun. 25, 2013

(65) Prior Publication Data
US 2014/0074593 A1    Mar. 13, 2014

Related U.S. Application Data

(60) Provisional application No. 61/698,244, filed on Sep. 7, 2012.

(51) Int. Cl.
*G06Q 30/00* (2012.01)
*G06Q 30/02* (2012.01)

(52) U.S. Cl.
CPC ...... *G06Q 30/0276* (2013.01); *G06Q 30/0246* (2013.01)

(58) Field of Classification Search
CPC .................................................. G06Q 30/0246
USPC ....................................................... 705/14.45
See application file for complete search history.

(56) References Cited

U.S. PATENT DOCUMENTS

| 4,833,308 A | 5/1989 | Humble |
| 4,882,675 A * | 11/1989 | Nichtberger et al. ...... 705/14.35 |

(Continued)

FOREIGN PATENT DOCUMENTS

| WO | 0186378 | 11/2001 |
| WO | 2012024109 | 2/2012 |

(Continued)

OTHER PUBLICATIONS

USPTO; Office Action dated May 7, 2014 in U.S. Appl. No. 13/477,806.

(Continued)

*Primary Examiner* — Amanda Abrahamson
*Assistant Examiner* — Scott C Anderson
(74) *Attorney, Agent, or Firm* — Snell & Wilmer L.L.P.

(57) ABSTRACT

A system is disclosed for allowing a merchant to create offers for distribution via multiple distribution channels. The distribution channels may include social media networks and location based services. The method may include receiving offer parameters for generating the offer, generating offer data based on the offer parameters and merchant transaction data, and determining data subsets of the offer data for distribution through multiple electronic distribution channels. The systems and methods may include associating a transaction account of the account holder with the offer, monitoring a transaction of the transaction account, comparing with a criterion governing the offer, and generating a report for the merchant. The report may include various metrics of the offer, such as return on investment, tracking information on the number of repeat customers and new customers during an offer period, and may occur approximately real-time with the transaction.

20 Claims, 21 Drawing Sheets

(56) References Cited

U.S. PATENT DOCUMENTS

| | | |
|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | McMullin |
| 6,266,649 B1 | 7/2001 | Linden et al. |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,882,290 B2 | 4/2005 | French et al. |
| 6,883,708 B1 | 4/2005 | Fiedler et al. |
| 6,904,408 B1 | 6/2005 | McCarthy et al. |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 | 11/2007 | Wanker |
| 7,392,224 B1 | 6/2008 | Bauer et al. |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,752,328 B2 | 7/2010 | Mortimore, Jr. et al. |
| 7,765,119 B2 | 7/2010 | Messa |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 * | 11/2010 | Merriman et al. .......... 705/14.45 |
| 7,844,490 B2 | 11/2010 | Patterson |
| 7,865,513 B2 | 1/2011 | Welch et al. |
| 7,870,022 B2 | 1/2011 | Bous et al. |
| 7,899,704 B1 | 3/2011 | Thompson |
| 7,925,540 B1 | 4/2011 | Orttung et al. |
| 7,933,810 B2 | 4/2011 | Morgenstern |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B1 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs |
| 8,484,088 B1 | 7/2013 | Orttung et al. |
| 8,484,093 B2 | 7/2013 | Bennett et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,423 B2 | 8/2013 | Rotbard et al. |
| 8,515,810 B2 | 8/2013 | Grimes |
| 8,517,258 B2 | 8/2013 | Taylor et al. |
| 8,543,470 B2 | 9/2013 | Grady et al. |
| 8,560,389 B2 | 10/2013 | Burgess et al. |
| 8,573,477 B2 | 11/2013 | Bennett et al. |
| 8,573,491 B2 | 11/2013 | Bennett et al. |
| 8,606,630 B2 | 12/2013 | Fordyce, III et al. |
| 8,615,426 B2 | 12/2013 | Carlson |
| 8,621,068 B2 | 12/2013 | Zohar et al. |
| 8,621,215 B1 | 12/2013 | Iyer |
| 8,626,579 B2 | 1/2014 | Fordyce, III et al. |
| 8,639,567 B2 | 1/2014 | Winters |
| 8,650,071 B2 | 2/2014 | Pointer et al. |
| 8,725,635 B2 | 5/2014 | Klein et al. |
| 8,874,674 B2 | 10/2014 | Allison et al. |
| 9,009,082 B1 | 4/2015 | Marshall et al. |
| 9,031,866 B1 | 5/2015 | Ng et al. |
| 2001/0014868 A1 | 8/2001 | Herz et al. |
| 2001/0020242 A1 | 9/2001 | Gupta et al. |
| 2001/0037254 A1 | 11/2001 | Glikman |
| 2001/0054003 A1 | 12/2001 | Chien et al. |
| 2002/0069079 A1 | 6/2002 | Vega |
| 2002/0069312 A1 | 6/2002 | Jones |
| 2002/0082920 A1 | 6/2002 | Austin et al. |
| 2002/0095357 A1 | 7/2002 | Hunter et al. |
| 2002/0138343 A1 | 9/2002 | Weatherford et al. |

(56) References Cited

U.S. PATENT DOCUMENTS

| | | |
|---|---|---|
| 2002/0178056 A1 | 11/2002 | Lim |
| 2003/0004802 A1 | 1/2003 | Callegari |
| 2003/0027630 A1 | 2/2003 | Kelly et al. |
| 2003/0028518 A1 | 2/2003 | Mankoff |
| 2003/0033211 A1 | 2/2003 | Haines et al. |
| 2003/0061093 A1 | 3/2003 | Todd |
| 2003/0078832 A1* | 4/2003 | Alvarez et al. ............... 705/10 |
| 2003/0208442 A1 | 11/2003 | Cockrill et al. |
| 2003/0233278 A1 | 12/2003 | Marshall |
| 2004/0006509 A1 | 1/2004 | Mannik et al. |
| 2004/0039686 A1 | 2/2004 | Klebanoff |
| 2004/0098326 A1 | 5/2004 | James |
| 2004/0122736 A1 | 6/2004 | Strock et al. |
| 2004/0153389 A1 | 8/2004 | Lortscher |
| 2004/0225509 A1 | 11/2004 | Andre et al. |
| 2004/0225573 A1 | 11/2004 | Ling |
| 2004/0243468 A1 | 12/2004 | Cohagan et al. |
| 2005/0010472 A1 | 1/2005 | Quatse et al. |
| 2005/0021401 A1 | 1/2005 | Postrel |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1 | 3/2005 | Bortolin et al. |
| 2005/0071230 A1 | 3/2005 | Mankoff |
| 2005/0096976 A1 | 5/2005 | Nelms |
| 2005/0149394 A1 | 7/2005 | Postrel |
| 2005/0159996 A1 | 7/2005 | Lazarus |
| 2005/0192863 A1 | 9/2005 | Mohan |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0004633 A1 | 1/2006 | Ashbaugh |
| 2006/0026067 A1* | 2/2006 | Nicholas et al. ............... 705/14 |
| 2006/0041480 A1 | 2/2006 | Briggs |
| 2006/0053056 A1 | 3/2006 | Alspach-Goss et al. |
| 2006/0064372 A1 | 3/2006 | Gupta |
| 2006/0074749 A1 | 4/2006 | Kline |
| 2006/0076400 A1 | 4/2006 | Fletcher |
| 2006/0085240 A1 | 4/2006 | Salehi-sedeh et al. |
| 2006/0095434 A1 | 5/2006 | McCullough et al. |
| 2006/0111930 A1 | 5/2006 | Ayer et al. |
| 2006/0116800 A1 | 6/2006 | Obradovich et al. |
| 2006/0122874 A1 | 6/2006 | Postrel |
| 2006/0129426 A1 | 6/2006 | Pearson |
| 2006/0136299 A1 | 6/2006 | Ruhmkorf |
| 2006/0155603 A1 | 7/2006 | Abendroth et al. |
| 2006/0155641 A1 | 7/2006 | Postrel |
| 2006/0167753 A1 | 7/2006 | Teague et al. |
| 2006/0178932 A1 | 8/2006 | Lang |
| 2006/0195359 A1 | 8/2006 | Robinson et al. |
| 2006/0212355 A1 | 9/2006 | Teague et al. |
| 2006/0224449 A1 | 10/2006 | Byerley et al. |
| 2006/0241859 A1 | 10/2006 | Kimchi et al. |
| 2006/0242011 A1 | 10/2006 | Bell et al. |
| 2006/0253321 A1 | 11/2006 | Heywood |
| 2006/0258397 A1 | 11/2006 | Kaplan et al. |
| 2006/0259364 A1 | 11/2006 | Strock et al. |
| 2006/0271552 A1 | 11/2006 | McChesney et al. |
| 2007/0000997 A1 | 1/2007 | Lambert et al. |
| 2007/0010942 A1 | 1/2007 | Bill |
| 2007/0022019 A1 | 1/2007 | Sherwin et al. |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0050258 A1 | 3/2007 | Dohse |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1 | 4/2007 | Bufford et al. |
| 2007/0129995 A1 | 6/2007 | Brandow |
| 2007/0130000 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0208879 A1 | 9/2007 | Liu |
| 2007/0210152 A1 | 9/2007 | Read |
| 2007/0214040 A1 | 9/2007 | Patel et al. |
| 2007/0244741 A1 | 10/2007 | Blume et al. |
| 2007/0244811 A1 | 10/2007 | Tumminaro |
| 2007/0260513 A1 | 11/2007 | Pavlov |
| 2007/0260523 A1 | 11/2007 | Schadt et al. |
| 2007/0288312 A1 | 12/2007 | Wang |
| 2007/0288372 A1 | 12/2007 | Behar et al. |
| 2008/0004917 A1 | 1/2008 | Mortimore, Jr. |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0033857 A1 | 2/2008 | Moses |
| 2008/0040211 A1 | 2/2008 | Walker et al. |
| 2008/0040288 A1 | 2/2008 | Mortimore, Jr. et al. |
| 2008/0052140 A1 | 2/2008 | Neal et al. |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1 | 4/2008 | Lundy et al. |
| 2008/0109317 A1 | 5/2008 | Singh |
| 2008/0109489 A1 | 5/2008 | Sherwood |
| 2008/0120155 A1 | 5/2008 | Pliha |
| 2008/0126515 A1 | 5/2008 | Chambers et al. |
| 2008/0147450 A1 | 6/2008 | Mortimore, Jr. |
| 2008/0147514 A1 | 6/2008 | Shuster et al. |
| 2008/0147773 A1 | 6/2008 | Aaron |
| 2008/0154664 A1 | 6/2008 | Kuo et al. |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0262925 A1 | 10/2008 | Kim et al. |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0294624 A1 | 11/2008 | Kanigsberg et al. |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1 | 3/2009 | Schmeyer et al. |
| 2009/0076912 A1 | 3/2009 | Rajan et al. |
| 2009/0094048 A1 | 4/2009 | Wallace et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |

(56) References Cited

U.S. PATENT DOCUMENTS

| | | |
|---|---|---|
| 2009/0210261 A1 | 8/2009 | Mortimore, Jr. et al. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327174 A1 | 12/2009 | Honkala |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0088174 A1 | 4/2010 | Cohagan et al. |
| 2010/0094697 A1 | 4/2010 | Canannaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125565 A1 | 5/2011 | MacIlwaine et al. |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1* | 6/2011 | Valdes et al. .................. 705/44 |
| 2011/0161154 A1 | 6/2011 | McLaughlin et al. |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0264490 A1 | 10/2011 | Durvasula et al. |
| 2011/0270617 A1 | 11/2011 | Pacheco E Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1 | 12/2011 | Scalisi |
| 2011/0302011 A1 | 12/2011 | Yoder et al. |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0150740 A1 | 6/2012 | Isaacson et al. |
| 2012/0197707 A1 | 8/2012 | Cohagan |
| 2012/0203604 A1 | 8/2012 | Baker et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |

(56) References Cited

U.S. PATENT DOCUMENTS

| | | |
|---|---|---|
| 2012/0226530 A1 | 9/2012 | Gebb et al. |
| 2012/0239479 A1 | 9/2012 | Amaro et al. |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0013396 A1 | 1/2013 | Vinson et al. |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0091000 A1 | 4/2013 | Hagey et al. |
| 2013/0103472 A1 | 4/2013 | Burgess et al. |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross |
| 2013/0191195 A1 | 7/2013 | Carlson et al. |
| 2013/0212177 A1 | 8/2013 | Friedman |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Boyer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1 | 12/2013 | Allison, Jr. et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046744 A1 | 2/2014 | Hagey |
| 2014/0046748 A1 | 2/2014 | Nagarajan et al. |
| 2014/0108108 A1 | 4/2014 | Artman et al. |
| 2014/0164199 A1 | 6/2014 | Wilkes |
| 2015/0039393 A1 | 2/2015 | Jain |
| 2015/0170256 A1 | 6/2015 | Pettyjohn |
| 2015/0248702 A1 | 9/2015 | Chatterton |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

USPTO; Final Office Action dated May 13, 2014 in U.S. Appl. No. 13/476,910.
USPTO; Final Office Action dated May 20, 2014 in U.S. Appl. No. 13/593,204.
USPTO; Notice of Allowance dated May 22, 2014 in U.S. Appl. No. 13/245,636.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
USPTO; Advisory Action dated Jul. 8, 2014 in U.S. Appl. No. 13/889,299.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
www.americanexpress.com/gift Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 27, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 8, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.

(56) References Cited

OTHER PUBLICATIONS

USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
International Preliminary Report on Patentability dated on Jun. 28, 2013 in Application No. PCT/US2012/027664.
International Preliminary Report on Patentability dated on May 23, 2013 in Application No. PCT/US2012/027810.
USPTO; Advisory Action dated Jun. 6, 2013 in U.S. Appl. No. 13/466,445.
USPTO; Office Action dated Sep. 23, 2013 in U.S. Appl. No. 13/889,307.
USPTO; Advisory Action dated Oct. 4, 2013 in U.S. Appl. No. 13/468,880.
USPTO; Advisory Action dated Oct. 7, 2013 in U.S. Appl. No. 12/857,424.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Advisory Action dated Apr. 30, 2014 in U.S. Appl. No. 13/715,423.
USPTO; Final Office Action dated May 5, 2014 in U.S. Appl. No. 13/411,281.
International Search Report and Written Opinion dated Dec. 7, 2012 in Application No. PCT/2012/056231.
International Preliminary Report on Patentability dated on Aug. 22, 2013 in Application No. PCT/US2012/056231.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 131889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated on Feb. 3, 2014 in Application No. PCT/US2013/028209.

(56) References Cited

OTHER PUBLICATIONS

USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii , "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pages 1-4, page last modified on Nov. 18, 2013, http://en.wikipedia.org/wiki/K-means++ retrieved from the web Nov. 21, 2013.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
International Preliminary Report on Patentability dated on May 7, 2013 in Application No. PCT/US2012/021648.
USPTO; Advisory Action dated May 9, 2013 in U.S. Appl. No. 13/477,806.
USPTO; Advisory Action dated May 22, 2013 in U.S. Appl. No. 13/188,693.
USPTO; Office Action dated May 23, 2013 in U.S. Appl. No. 13/734,693.
USPTO; Advisory Action dated Sep. 3, 2014 in U.S. Appl. No. 13/466,412.
USPTO; Advisory Action dated Jul. 30, 2014 in U.S. Appl. No. 13/411,281.
USPTO; Office Action dated Jul. 30, 2014 in U.S. Appl. No. 13/794,301.
USPTO; Advisory Action dated Sep. 3, 2014 in U.S. Appl. No. 13/467,503.
USPTO; Advisory Action dated Aug. 7, 2014 in U.S. Appl. No. 13/468,931.
USPTO; Office Action dated Oct. 20, 2014 in U.S. Appl. No. 13/941,306.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/021,237.
USPTO; Office Action dated Oct. 17, 2014 in U.S. Appl. No. 11/779,734.
USPTO; Advisory Action dated Sep. 3, 2014 in U.S. Appl. No. 12/857,389.
USPTO; Advisory Action dated Jul. 30, 2014 in U.S. Appl. No. 13/593,204.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 3, 2014 in U.S. Appl. No. 12/857,424.
USPTO; Advisory Action dated Sep. 2, 2014 in U.S. Appl. No. 13/466,445.
USPTO; Office Action dated Oct. 8, 2014 in U.S. Appl. No. 13/734,693.
USPTO; Advisory Action dated Jul. 31, 2014 in U.S. Appl. No. 13/476,910.
USPTO; Office Action dated Oct. 17, 2014 in U.S. Appl. No. 14/065,883.
Examination Report dated Aug. 11, 2014 in New Zealand Application No. 623019.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.

(56) References Cited

OTHER PUBLICATIONS

USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Advisory Action dated Jun. 10, 2015 in U.S. Appl. No. 13/477,806.
USPTO; Final Office Action dated Feb. 26, 2015 in U.S. Appl. No. 13/941,306.
Aimeur et al., "Alambic: a privacy-preserving recommender system for electronic commerce," Feb. 27, 2008, Springer-Verlag, pp. 307-334.
USPTO; Final Office Action dated Jan. 28, 2015 in U.S. Appl. No. 13/889,307.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
Search Report and Written Opinion dated Feb. 16, 2015 in Singapore Application No. 11201400788P.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Advisory Action dated May 8, 2015 in U.S. Appl. No. 13/941,306.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 20, 2016 in U.S. Appl. No. 13/889,307.
Liapis, et al., Implementing a Low-Cost, Personalized and Location Based Service for Delivering Advertisements to Mobile Users, Athens Information Technology, Oct. 2008, ieeexplore.ieee.org, 49 pages.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 131188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 28, 2015 in U.S. Appl. No. 13/794,272.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Advisory Action dated Nov. 17, 2015 in U.S. Appl. No. 13/468,880.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.

(56) References Cited

OTHER PUBLICATIONS

USPTO; Advisory Action dated Nov. 17, 2015 in U.S. Appl. No. 13/889,299.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Feb. 1, 2016 in U.S. Appl. No. 13/443,100.
USPTO; Final Office Action dated Feb. 2, 2016 in U.S. Appl. No. 13/941,306.
USPTO; Advisory Action dated Mar. 28, 2016 in U.S. Appl. No. 14/065,883.
USPTO; Final Office Action dated Feb. 9, 2016 in U.S. Appl. No. 13/794,374.
USPTO; Advisory Action dated Mar. 18, 2016 in U.S. Appl. No. 13/411,281.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Final Office Action dated Feb. 9, 2016 in U.S. Appl. No. 13/794,272.
USPTO; Advisory Action dated Mar. 25, 2016 in U.S. Appl. No. 13/794,301.
Written Opinion dated Aug. 5, 2015 in Singapore Application No. 11201400788P.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 26, 2016 in U.S. Appl. No. 13/477,806.
USPTO; Office Action dated May 19, 2016 in U.S. Appl. No. 13/926,895.
USPTO; Notice of Allowance dated May 25, 2016 in U.S. Appl. No. 13/439,768.
Resnick, et al., "Recommender Systems", Mar. 1997, Communications of the ACM, vol. 40, No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016 in U.S. Appl. No. 13/889,299.
"What is a token in programming?" Quora, pp. 1-3, retrieved from https://www.quora.com/What-is-a-token-in-programming on May 31, 2016.

\* cited by examiner

Merchant Site Log-In

Log in to take advantage of marketing programs, supplies, and reports than can help grow your business.

| User ID | [                    ] | ☐ Remember Me  What is this? |
| Password | [                    ] | |

Forgot Password?  [LOG IN]

Explore the Marketing Campaign Online Merchant Services

Access your payments, view disputes, and manage your account with Online Merchant Services. To learn more or enroll, click here.

Don't have an account? Enroll now.

[BACK]

Figure 5

Offer Setup (Segmenting)

| HOME | CREATE AN OFFER | MANAGE OFFERS |

Acme's Bistro

1. Select Segment   2. Build Offer   3. Review/Submit   4. Confirm

What is your business need?

| Acquire New Customers | Increase Customer Loyalty | Drive Customer Visit |

< Go Back

Figure 7

Offer Setup (Construct Development)

| HOME | CREATE AN OFFER | MANAGE OFFERS |

1. Select Segment   2. Build Offer   3. Review/Submit   4. Confirm

Acme's Bistro

< Change Offer Segment

**Build Your Offer to: *Acquire New Customers***
Recommended Offer based on your business average:

| Credit: | 20% | % | How much should I offer? |
| Spend: | $45.00 | | What's a good threshold? |
| Visit: | 1 | | How should I choose # of visits? |
| Limit: | 2,000 | | How should I cap exposure? |
| Start Date: | 12/20/11 | | End Date: 12/31/11 |

Switch to mobile coupon

< Go Back                                        NEXT

Figure 8

Minimum offer guidelines for various objectives

| Targeting Type | Minimum Offer Guideline |
|---|---|
| All Inclusive | 20% - 50% discount value (default to 20% value) |
| Loyalty | 15% - 50% discount value (default to 15% value) |
| Acquisition | 30% - 50% discount value (default to 30% value) |

Figure 9

Offer Setup (Construct Development)

| HOME | CREATE AN OFFER | MANAGE OFFERS |

Acme's Bistro

1. Select Segment   2. Build Offer   3. Review/Submit   4. Confirm

< Change Offer Segment

Your current average customer spends:

$45 / transaction     100 transactions per month

Build Your Office to: *Acquire New Customers*

Recommended Offer based on your business average:

- Credit: 20 %
- Spend: $45.00
- Limit: 2,000
- Start Date: 12/20/11

How much should I offer?
What's a good threshold?
How should I cap exposure?
Start Date: 12/20/11
End Date: 12/31/11

Switch to mobile coupon

< Go Back     [ NEXT ]

Figure 10

Offer Setup (Review & Submit)

HOME           CREATE AN OFFER         MANAGE OFFERS

Acme's Bistro

1. Select Segment   2. Build Offer   3. Review/Submit   4. Confirm

< Edit Offer

Coupon Offer

20% Statement Credit for $45.00 spending
Valid from 12/20/11 – 12/31/11
Limited to the first 2,000 cardmembers I agree to the Terms and Conditions < Go Back          SUBMIT Offer Setup (Confirmation / Cross Sell / 4SQ Connect)

| HOME | CREATE AN OFFER | MANAGE OFFERS |

1. Select Segment   2. Build Offer   3. Review/Submit   4. Confirm

Acme's Bistro

Congrats! Starting December 20th, 2011, your offer will be distributed across the application network.   (?)

You can also distribute your offer on these networks:

| Social Media Channel 2 |   | Social Media Channel 1 |
| [Connect] |   | ON ◯ |

Remember, you can view and manage our offer performance in: Offer Dashboard

[UPDATE]

Figure 12A

Offer Setup (Confirmation / Cross Sell / 4SQ Connect)

Figure 12B

Management Dashboard

| | | | | |
|---|---|---|---|---|
| HOME | | CREATE AN OFFER | | MANAGE OFFERS |

Acme's Bistro

| STATUS | DATES | OFFER | PERFORMANCE | ACTIONS |
|---|---|---|---|---|
| LIVE | 12/20/11 – 12/31/11 Expires in 10 days | 20% credit for $45 spend 2,000 Limit<br><br>Social Media Channel 1 \| Social Media Channel 2 | Reporting | Cancel |
| PENDING | 1/20/12 – 1/31/12 | 20% credit for $45 spend 2,000 Limit | Reporting | Cancel |

Recommended Offer Curriculum:

| | | |
|---|---|---|
| ACTIVATE | 20% credit for $85 spend | Increase Customer Loyalty |
| ACTIVATE | 20% credit for $45 spend | Increase Customer Loyalty |

< Go Back        CREATE NEW OFFER

Figure 15

MARKETING CAMPAIGN APPLICATION FOR MULTIPLE ELECTRONIC DISTRIBUTION CHANNELS

CROSS-REFERENCE TO RELATED APPLICATIONS

This application claims priority to and the benefit of U.S. Ser. No. 61/698,244 filed Sep. 7, 2012, entitled "MARKETING CAMPAIGN APPLICATION FOR MULTIPLE ELECTRONIC DISTRIBUTION CHANNELS," which is incorporated by reference herein in its entirety.

FIELD

The present disclosure generally relates to generating an offer for distribution across multiple electronic distribution channels.

BACKGROUND

As the internet and electronic communications evolve into more interactive and personalized experiences for a user, more and more channels of electronic communication are developed, marketing efforts may be distributed across the multiple electronic communication channels, including various social media platforms. A merchant may be provided new opportunities to reach customers and potential customers in a faster, more targeted manner than conventional marketing. These new opportunities come with the burden of a merchant needing to generate and manage redundant and/or multiple offers for distribution across the multiple electronic communication channels. Further, it may be very difficult for a merchant to be able to calculate the return or benefit of multiple offers across the various channels.

SUMMARY

In various embodiments, the present disclosure provides methods, systems, and computer readable medium for allowing a merchant to create offers for distribution via multiple electronic distribution channels. The electronic distribution channels may include social media networks and location based services. In various embodiments, the method comprises receiving, at a computer-based system, offer parameters for generating an offer, generating offer data based on the offer parameters and based on at least one of merchant data and multiple account holders' data, wherein the offer comprises providing a coupon-less offer to an account holder, determining a first data subset of the offer data for distribution through a first electronic distribution channel, and determining a second data subset of the offer data for distribution through a second electronic distribution channel. The offer parameters may be received from a merchant. Additionally, at least one of the first data subset distributed through the first electronic distribution channel is based on the capabilities of the first electronic distribution channel, and wherein the second data subset distributed through the second electronic distribution channel is based on the capabilities of the second electronic distribution channel. In various embodiments, the first electronic distribution channel and the second electronic distribution channel individually comprise at least one of a merchant website, a social media website, an affiliate website, a partner website, an external vendor, and a mobile device communication.

Further, in various embodiments, the method can also comprise receiving a selection of at least one merchant location for redemption of the offer. The method may include receiving a selection of a criterion for the offer. The offer parameters can be provided based on a business objective, and wherein the business objective is at least one of acquisition of new customers, and loyalty of prior customers. Also, the computer-based system can provide offer parameter guidelines based on the business objective. In various embodiments, the method can further comprise matching an accepted offer with a record of charge (ROC) in a transaction account held by the account holder, and crediting the transaction account based upon the matching. Similarly, the computer-based system may debit a transaction account held by a merchant in response to the crediting. A transaction account held by the merchant system may be debited in response to the computer-based system matching an accepted offer with a record of charge in a transaction account held by the account holder.

The account holder may be selected based on account history, where the account history comprises at least one of prior transaction data, loyalty points, reward points, location of prior transactions, past purchases, transaction amount, transaction volume, and account status. Further, the account holder may be selected based on at least one of demographics and a location of the account holder. The location of the account holder may be determined based upon at least one of: a zip code, a GPS signal, a location signal and a submitted location by the account holder.

In addition to generating an offer, the system and method may further include associating a transaction account of the account holder with the offer, monitoring a transaction of the transaction account, comparing the transaction with a criterion governing the offer, and generating a report based on the transaction and account holder data. In addition, in various embodiments, the method may comprise obtaining transaction data of one or more transactions at the merchant from a third-party institution, where the transaction data corresponds to account holder data, comparing the one or more transactions with a criterion governing the offer, and generating a report based on the one or more transactions and the account holder data. Providing the report to an entity that provides the offer parameters. The report may be provided to an entity that provides the offer parameters. The reporting information in the report may include at least one of number of the offers transmitted, number of the offers accepted, number of the offers redeemed, total value of the redeemed offers, average size of the transaction involving the offer, and rate of the offer redemption. The reporting information in the report may include a return on investment, where the return on investment is based on a comparison of the first transactions during an offer period and second transactions during a non-offer period. Additionally, the reporting information in the report may include non-transaction information, where the non-transaction information includes at least one of demographic information of the account holder and social media indicators. The reporting information in the report may include tracking information on repeat customers and new customers during an offer period. Also, the generation of the report can occur approximately real-time with the transaction. One advantage of approximately real-time report generation is the ability to modify the offer based on the reporting data. The real-time reporting may facilitate generating a second marketing campaign that modifies the offer based on reporting information in the report.

In various embodiments, the present disclosure provides methods and systems for setting, by a merchant system, offer parameters, where an offer is generated based on the offer parameters by a computer-based system configured to facilitate the offer, selecting a first electronic distribution channel and a second electronic distribution channel, where the offer is distributed by the computer-based system to an account holder via the first electronic distribution channel and the second electronic distribution channel, and receiving, at the merchant system and from the computer-based system, a report based on a transaction associated with the offer. The method and system may further include a merchant selecting a merchant location for redemption of the offer, or setting a criterion for the offer. In various embodiments, the computer-based system can be configured to generate offer data based on the offer parameters and merchant transaction data, where the computer-based system is further configured to determine a first data subset of the offer data for distribution through the first electronic distribution channel and determine a second data subset of the offer data for distribution through the second electronic distribution channel.

BRIEF DESCRIPTION OF THE DRAWINGS

The features and advantages of the present disclosure will become more apparent from the detailed description set forth below when taken in conjunction with the drawings, wherein like numbers refer to like elements.

FIG. 5 illustrates an exemplary screenshot of a merchant log-in page of the marketing campaign application, in accordance with various embodiments;

FIG. 7 illustrates an exemplary method of segmenting an offer based on a business objective, in accordance with various embodiments;

FIG. 8 illustrates an exemplary screenshot of constructing an offer campaign, in accordance with various embodiments;

FIG. 9 illustrates an exemplary table of offer guidelines for an offer campaign, in accordance with various embodiments;

FIG. 10 illustrates another exemplary screenshot of constructing an offer campaign, in accordance with various embodiments;

FIGS. 12A-12B illustrate exemplary screenshots of selecting social networks for electronic distribution of an offer campaign, in accordance with various embodiments;

FIG. 15 illustrates an exemplary screenshot of a management dashboard of a marketing campaign application, in accordance with various embodiments;

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
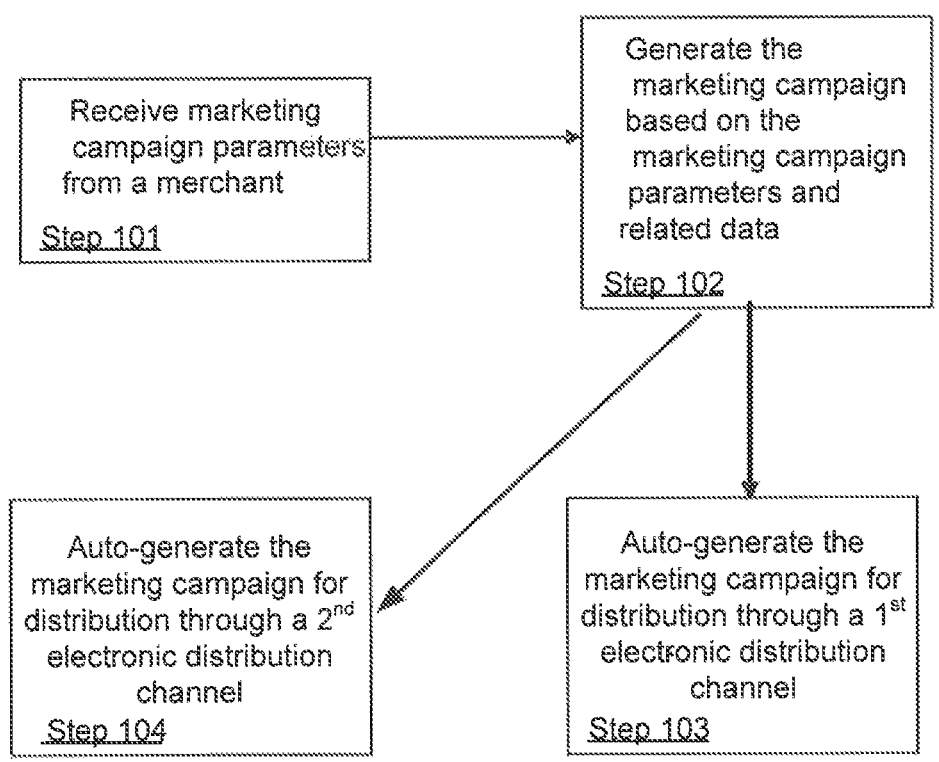
FIG. 1 is a high level flow diagram of a process for generation and management of an offer across multiple distribution channels, in accordance with various embodiments.

The present disclosure provides a method and system for facilitating the creation (e.g., by a merchant) of offers for distribution (e.g., via multiple electronic distribution channels). In various embodiments, and with reference to FIG. 1, a method comprises receiving offer parameters (e.g., from a merchant or third party entity) (step 101), generating the offer based on the offer parameters, data related to the merchant and/or multiple account holders (step 102), modifying the offer for distribution through a first electronic distribution channel (step 103), and modifying the offer for distribution through a second electronic distribution channel (step 104).

Figure 2:
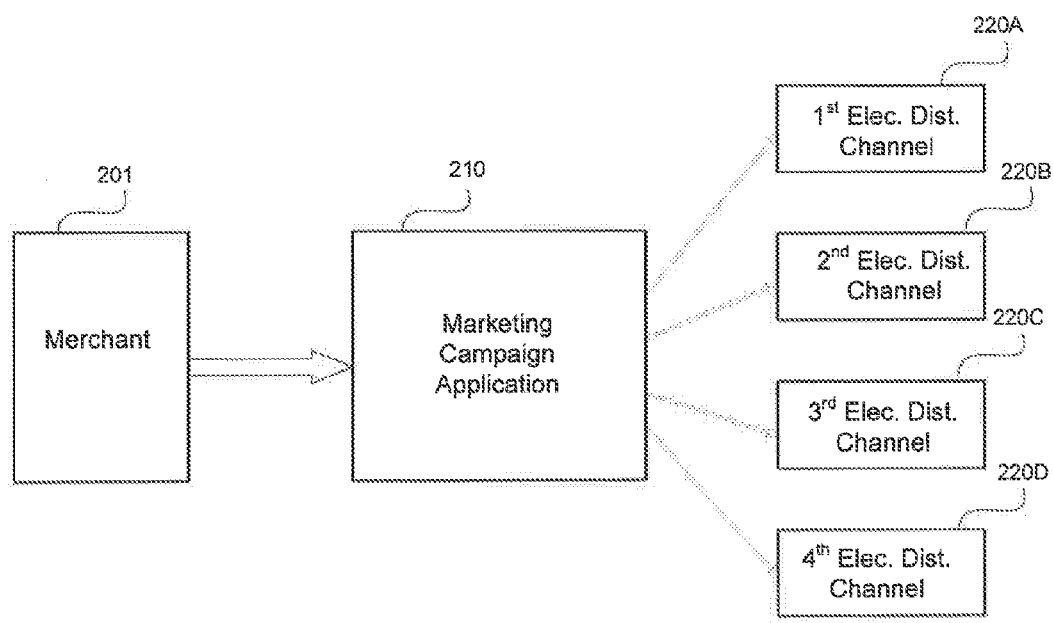
FIG. 2 illustrates an exemplary system diagram, in accordance with various embodiments.

A system for implementing the described method, in various embodiments and with reference to FIG. 2, may include a marketing campaign system comprising a merchant system 201 in communication with a marketing campaign application 210, with the marketing campaign application 210 being in further communication with multiple electronic distribution channels 220. The marketing campaign application 210 receives offer parameters from merchant 201 or a third party entity. The campaign parameters may include merchant defined parameters, such as, for example, minimum spend, discount requirements, campaign duration, and/or locations accepting the campaign offer. In addition, marketing campaign application 210 may also receive merchant data and/or multiple account holders' data. The merchant data may be received from merchant 201 and/or a separate database. Similarly, multiple account holders' data may be received from one or more financial institutions, payment processors and/or a separate database. Marketing campaign application 210 generates offer data based on the offer parameters, merchant data, and/or multiple account holders' data. In various embodiments, marketing campaign application 210 determines which data of the offer data to provide to a specific electronic distribution channel. The determination of which data to provide is based on the capabilities of the specific electronic distribution channel. The electronic distribution channel capabilities can include various media content, hyperlinks, various display formats, various graphical options, and the like. The offer data may be modified for different electronic distribution channels in order to operate in association with the appropriate formats, provided data, graphical display, and other elements/functions as would be known to one skilled in the art after reading the present disclosure. The marketing campaign application 210 can be configured to parse the offer data in order to provide a subset of the offer data to the specific electronic distribution channel. Accordingly, the marketing campaign application 210 may generate a first data subset of the offer data to provide to a first electronic distribution channel 220A. The marketing campaign application 210 may also be configured to generate additional data subsets of the offer data to provide to one or more additional channels, such as a second data subset for a second electronic distribution channel 220B, a third data subset for a third electronic distribution channel 220C, a fourth data subset for a fourth electronic distribution channel 220D, etc.

In accordance with various embodiments, the individual electronic distribution channels may impact the formatting and appearance of the individual offers of the offer. Marketing campaign application 210 can be configured to provide specific input data to each electronic distribution channel, such that each individual channel receives the appropriate offer data. In various embodiments, the first electronic distribution channel 220 and/or the second electronic distribution channel 220 may comprise at least one of a merchant website, a social media website, affiliate or partner websites, an external vendor, a mobile device communication, social media network and/or location based service. Examples of social media channels include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, MMS and/or mobile applications for smartphones.

One benefit of marketing campaign application 210 is that merchant 201 does not have to fully or partially develop and manage multiple offers over multiple distribution channels. Marketing campaign application 210 fully or partially facilitates the development and management aspects of multiple subsets of offer data over multiple channels through a single interface. In this way, the offer data may be fully or partially consistent and merchant 201 can make a single change at marketing campaign application 210 that is incorporated in one or more of the multiple subsets of offer data. Furthermore, in various embodiments, merchant 201 can use the single interface to make changes specific to one or more offers without changing all the offers. For further information about changes to one offer (or offer model) impacting other offers (or offer models), see U.S. Pat. No. 8,150,662 issued on Apr. 3, 2012 and entitled "METHOD AND COMPUTER READABLE MEDIUM FOR VISUALIZING DEPENDENCIES OF SIMULATION MODELS," which is hereby incorporated by reference in its entirety for all purposes.

Figure 3:
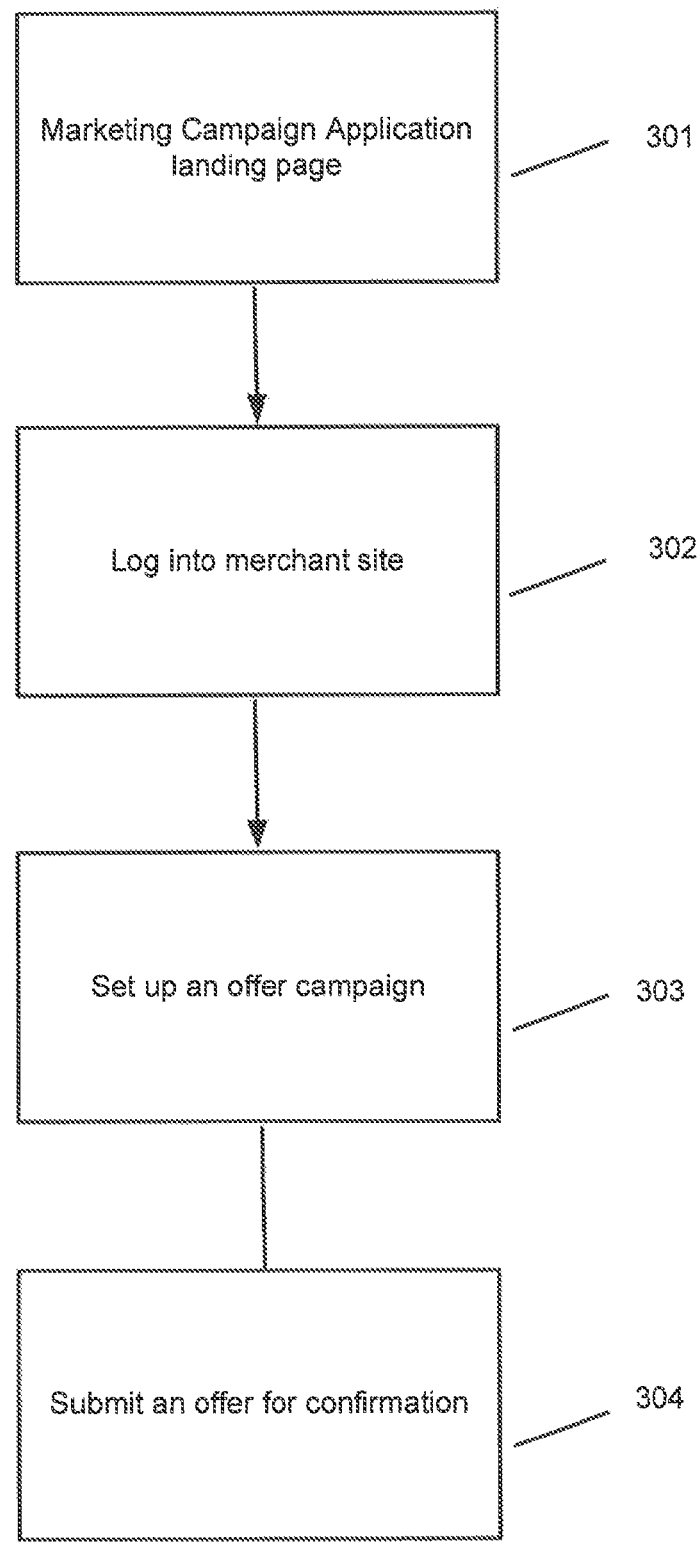
FIG. 3 illustrates an exemplary high-level method of using a marketing campaign application 210, in accordance with various embodiments.

Creating an offer using the marketing campaign application 210 involves various steps for the user (e.g. merchant/marketing company). In various embodiments and with reference to FIG. 3, to create an offer a merchant accesses the marketing campaign application 210 landing page (301), and logs into the merchant site (302) of the marketing campaign application 210. The merchant sets up an offer campaign (303) and submits an offer for confirmation (304) by the marketing campaign application 210.

Figure 4:
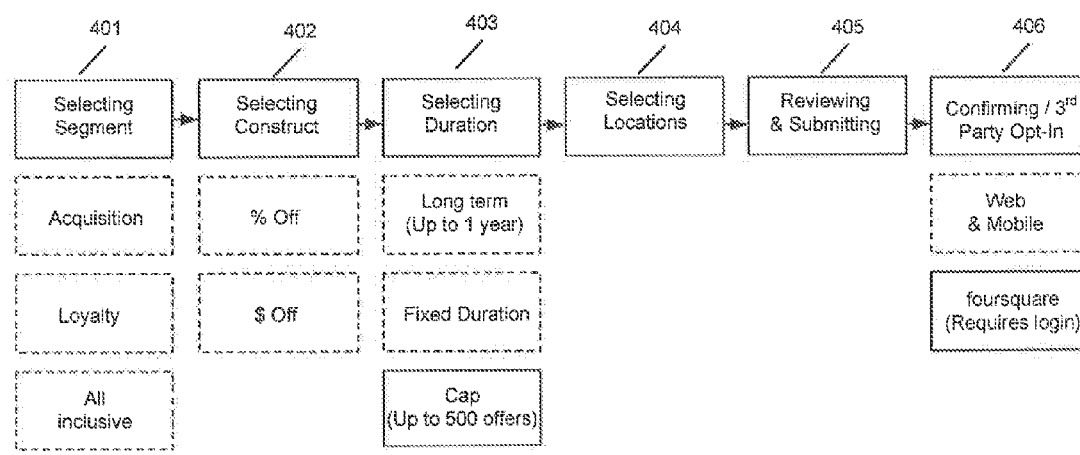
FIG. 4 illustrates an exemplary method of generating an offer campaign, in accordance with various embodiments.
Figure 6A:
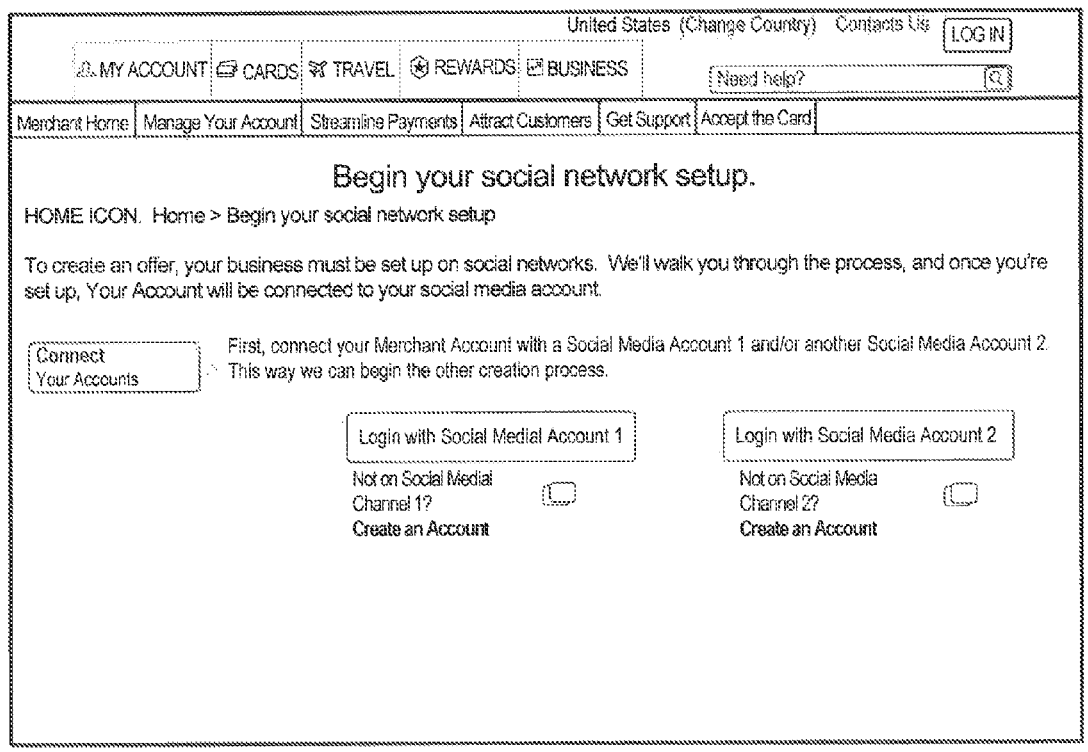
FIGS. 6A-6D illustrate exemplary screenshots of a social network set-up page of the marketing campaign application, in accordance with various embodiments.
Figure 6B:
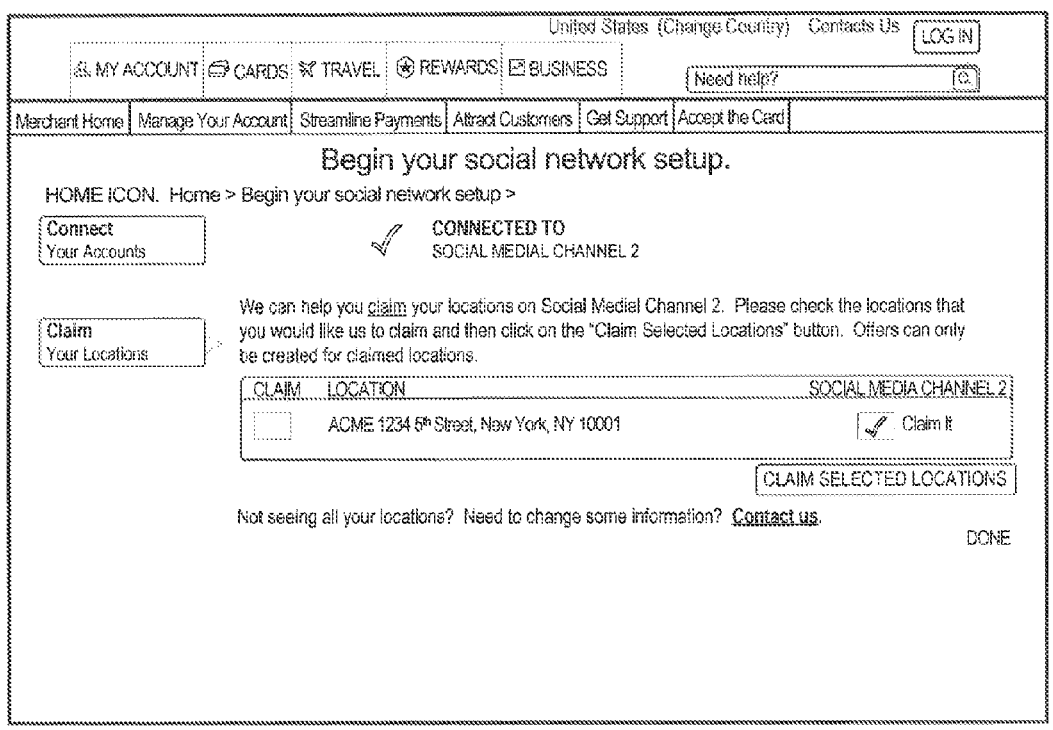
Figure 6C:
Figure 6D:
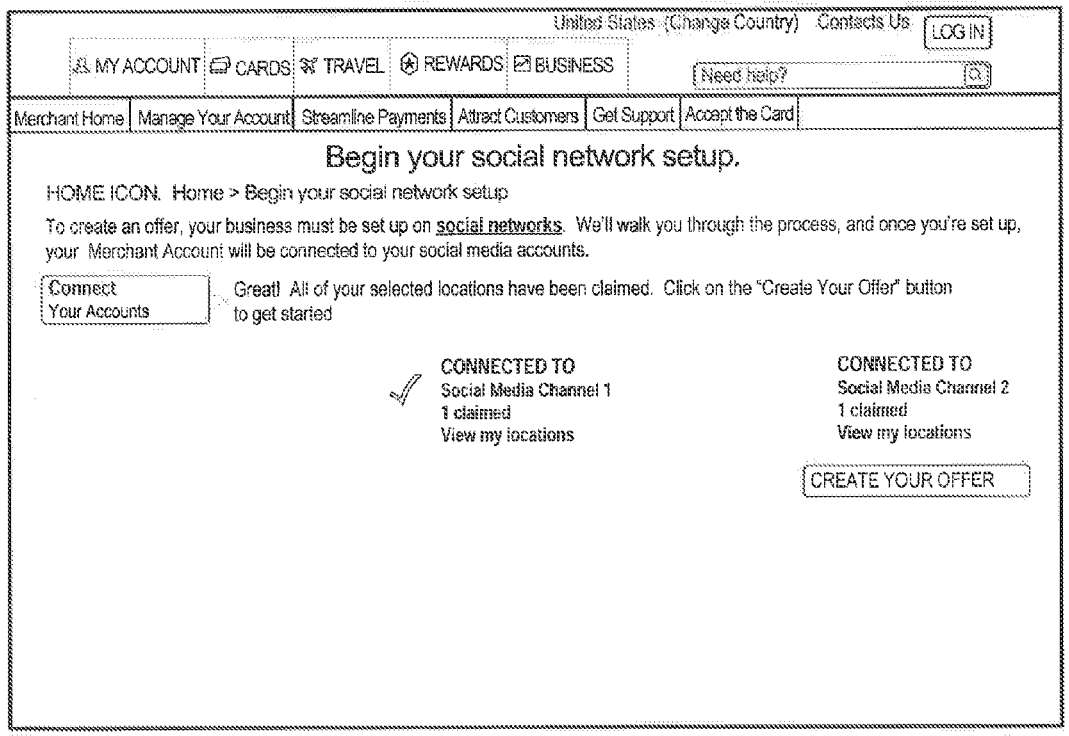

The setting up of an offer campaign may include various steps. For example and with reference to FIG. 4, a method of setting up an offer can include selecting a segment 401 which can include the purpose behind the offer such as acquisition, loyalty, or all-inclusive (as further explained herein). The method may also include selecting a construct 402 of whether the offer is a percentage discount, a certain value discount, and/or other. The method can also include selecting a duration 403 of the offer such as, for example a fixed date duration, a redemption cap, and/or a long-term offer expiration. Further, if the merchant has more than one location and/or website, the method can include selecting one or more locations 404 to be valid for the offer. After the offer campaign framework is setup, the merchant can review the offer and submit for confirmation 405. The marketing campaign application 210 can be configured to confirm the offer campaign and various electronic distribution channels, including third party channels 406. The confirmation may be based on any suitable criteria such as, for example, appropriateness of discount or reward, conformance with rules, duration requirements, etc.

Various examples of application screen shots and offers are presented to provide additional detail to the above disclosure. For example, FIG. 5 is one example of a merchant log-in page for accessing the marketing campaign application 210. The merchant provides a user identification and password for authentication and accessing the merchant's account. After a merchant has logged-on to the marketing campaign application 210, the merchant can connect to various electronic distribution channels as illustrated in FIGS. 6A-6D. In the exemplary screen shots, the electronic distribution channels include social media channels such as, for example, Facebook® and Foursquare®.

In various embodiments and with respect to FIG. 7, an offer campaign can be directed towards a selected segment of people based on a business objective, such as acquisition, loyalty, or all-inclusive. The acquisition objective can be designed to send the offer campaign to new customers that have not sufficiently patronized the merchant. The loyalty campaign can be designed to send the offer campaign to prior customers who have previously patronized the merchant. The all-inclusive campaign can be designed to send the offer campaign to both new and prior customers, and therefore reach a wider segment of people. Within the various segments, other criteria may be applied to further segment the directed offer. The other criteria may include a customer's location, a customer's patronage of similar or related merchants, how recently a customer patronized a merchant, and/or people or entities associated with the customer patronizing or being associated with the merchant. Customer interaction, association or patronization may be determined by merchant data, customer data or payment processor data.

The parameters of an offer are formed in order to build an offer campaign. The parameters may be set by the merchant. Further, the marketing campaign application 210 may suggest parameters for the merchant's consideration. With reference to FIG. 8, the exemplary screen shot illustrates selecting parameters such as percent discount or discount value, a spend threshold to receive the discount, the number of visits to use the offer, the duration (start and end dates), and whether the offer can be capped at a specific number of offers or redeemed offers. The referenced screen shot provides recommendations of the parameters to the merchant based on the merchant's average customer.

In accordance with various embodiments and with reference to FIG. 9, the marketing campaign application 210 can set boundaries and/or guidelines for the offer parameters according to the business objective. For example, an offer campaign with an all-inclusive objective can have a discount value guideline of 20% to 50%, with a 20% value being the default. Similarly, an offer campaign with a loyalty objective can have a discount value guideline of 15% to 50%, with a 15% value being the default. Likewise, an offer campaign with an acquisition objective can have a discount value guideline of 30% to 50%, with a 30% value being the default. The guideline limitations may be optional or required. The marketing campaign application 210 can require offers in line with the motivation so that it may provide guidance to the merchant. Furthermore, the marketing campaign application 210 is able to apply prior offer data to the current campaign, for example, by imposing such limitations.

In various embodiments, the marketing campaign application 210 is capable of providing recommendations based on an average customer because the marketing campaign application 210 receives past merchant transaction data from a payment processor or a third party institution. The past merchant transaction data includes both information on the merchant transactions and also information on the merchant's customers. For example and with reference to FIG. 10, the marketing campaign application 210 can provide offer parameter recommendations based on the average customer spending $45 per transaction and conducting 100 transactions a month. In this example, the average transaction amount of $45 is the basis for recommending a spend threshold of $45.

In various embodiments, the marketing campaign application 210 can vary the offer campaign based on different customer segments. For example, a first segment or population of customers may be offered a first discount level and a second segment or population of customers may be offered a second discount level. In one example, new customers may be offered a discount level of 25% and returning customers may be offered a discount level of 10%. Furthermore, various customers may be added or removed from the offer campaign for various reasons, such as removing consistent customers. Irregular prior customers may also be added or removed. For additional detail on removing specific people from a list, U.S. application Ser. No. 12/857,389, filed Aug. 16, 2010 and entitled "SYSTEM AND METHOD FOR E-MAIL BASED REWARDS," is hereby incorporated by reference in its entirety.

Figure 11:
FIG. 11 illustrates an exemplary screenshot of a reviewing an offer campaign, in accordance with various embodiments.
Figure 12B:
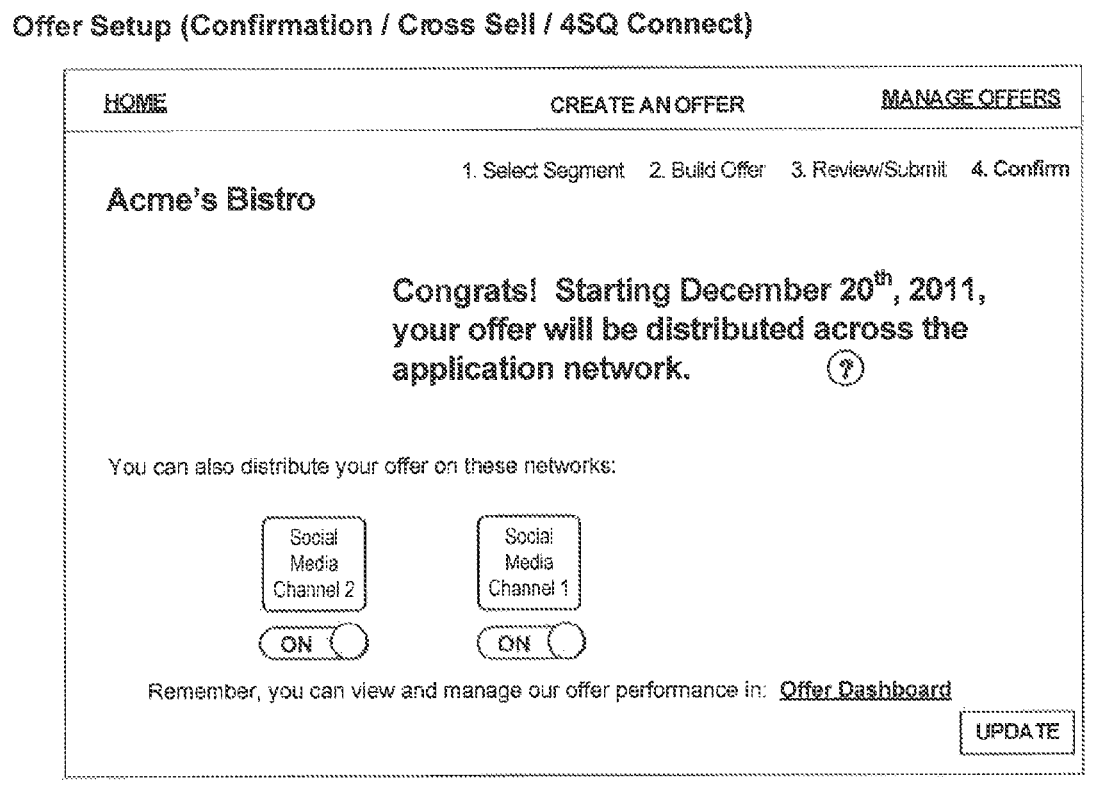
Figure 13:
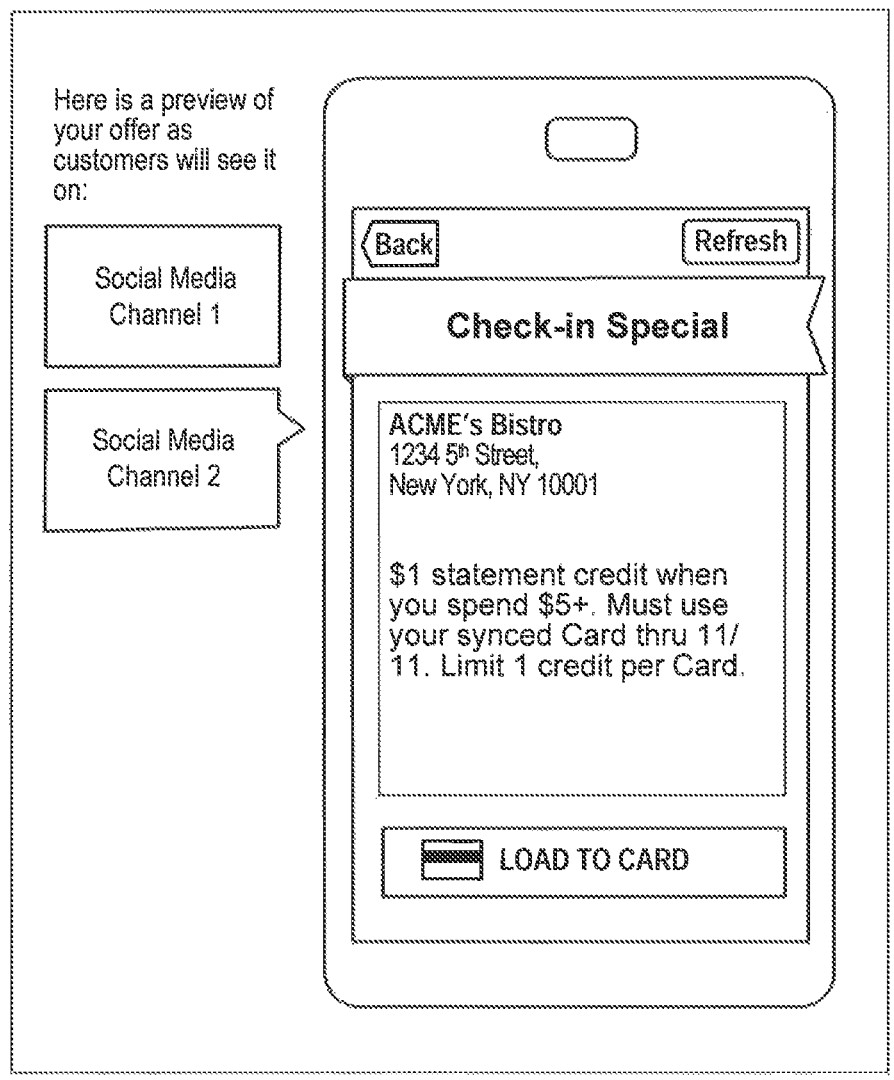
FIG. 13 illustrates an exemplary embodiment of an offer campaign on a mobile device, in accordance with various embodiments.

In response to the offer campaign setup, the merchant may review and submit the offer, as illustrated in FIG. 11. The completed and confirmed offer campaign can be distributed across multiple electronic distribution channels. In various embodiments and with reference to FIGS. 12A-12B, the merchant can select which electronic distribution channels and associated social networks to distribute the offer campaign. One example of a completed mobile offer is illustrated in FIG. 13.

Figure 14:
FIG. 14 illustrates an exemplary screenshot of location management of an offer campaign, in accordance with various embodiments.

In addition to a merchant creating an offer campaign with various parameters, the offer campaign can be applied to multiple merchant locations (e.g. regions). In various embodiments and with reference to FIG. 14, a merchant may have more than one location. The offer campaign can be valid for one or more locations, as set by the merchant. The merchant can control which locations are valid for the offer campaign within the marketing campaign application 210. Furthermore, in various embodiments, the merchant can tailor the offer campaigns to individual locations as well. For example, a first location can have an offer campaign with an acquisition objective and a second location can have an offer campaign with a loyalty objective.

As part of the offer, an offer may be provided to an account holder as the customer. The offer may be valid in response to a transaction or the account holder satisfying at least one criterion of the offer. The criterion may be set by the merchant. The criterion may include one or more of a transaction date range, an enrollment cap, a spending percentage, a threshold level, and/or the like. The various types of offers may include an offer that is partially or fully applied at the time of the transaction, and/or an offer that is partially or fully applied after the transaction is completed. In order to apply the offer after the transaction is completed, the method may include matching an accepted offer with a record of charge (ROC) in a transaction account held by the account holder, and crediting the transaction account held by the account holder based upon the matching. The offer may be a rewards offer, such as an offer of a credit of monetary value to the transaction account, a merchant prepaid account, a discount, or a credit of loyalty points. For additional detail regarding applying an offer after the transaction is completed, U.S. application Ser. No. 13/411,281, entitled "SYSTEM AND METHOD FOR PROVIDING COUPON-LESS DISCOUNTS BASED ON A USER BROADCASTED MESSAGE," is hereby incorporated by reference in its entirety. Again, the offer may be provided to an account holder via one or more distribution channels.

In accordance with various embodiments, an account holder is selected to receive an offer based on at least one of location, active registration, and/or prior transaction history. A location of an account holder may be determined based upon one or more of a travel itinerary, a GPS signal, a location signal, for example, proximity of a mobile communication device to a cellular base station, and/or a zip code. Further, an account holder may register to receive a coupon offer or a coupon-less offer. In various embodiments, a coupon offer can be redeemed when a customer presents a physical coupon or a digital-representation, such as a bar code on a mobile phone (e.g. during the transaction checkout.) The merchant processes the offer during the transaction and the discount may be applied prior to completion of the checkout. The tracking and reporting of the coupon redemption can be performed by the merchant.

In various embodiments, a coupon-less offer can be redeemed during a transaction without presenting a coupon or bar code. No interaction needs to take place at the merchant because the coupon-less offer is redeemed as a credit to the card member after the transaction is completed. Though coupons may be presented for a different offer during the transaction, it is understood that the coupon-less offer is conducted for that specific offer without a coupon present. Furthermore, a coupon provided to a user either before or after the transaction can still be considered a coupon-less offer if no coupon or bar code is presented during the transaction. An advantage of a coupon-less offer is that the redemption can be tracked and reported by a payment processor or third-party. An offer from a merchant registered to provide coupon-less offers may be transmitted to a mobile communication device. In various embodiments, the offer may be provided based upon the location of the account holder. In various embodiments, a merchant's offer may be limited to selecting, by the merchant, at least one merchant location for redemption of the offer. An offer, once accepted by an account holder, may be matched to a record of charge associated with a transaction account held by the account holder. A credit may be applied to the account holder's transaction account and a debit may be applied to a transaction account of the registered merchant. A credit may be applied based upon a transaction complying with one or more criteria specified by a registered merchant for a coupon-less offer. An exemplary criterion comprises a spend level on a class of products. One or more offer categories and/or one or more offer category classes may be transmitted to the mobile communication device based upon the account holder's location.

The determination of who receives the offer may also be based (at least in part) on the transaction history of the account holder. Furthermore, the qualification for any reward associated with the offer may be based (at least in part) on an aggregate transaction history of the account holder. Also, the qualification for the rebate credit may be based (at least in part) on a product identifier corresponding to at least one of a particular product or a vendor. An offer based on a prior transaction at a first merchant may result in an offer for the same first merchant or for a second merchant. For example, the second merchant may be a competitor of the first merchant or may be complementary to the first merchant, thereby having a higher likelihood of the account holder redeeming the offer.

An account holder can receive the predefined offer in a variety of ways. For example, the account holder can receive the predefined offer on a portable electronic device. Moreover, in various embodiments, an account holder identifier may be a unique identifier associated with the portable electronic device, which is associated with the account holder. The unique identifier associated with the portable electronic device may be used to match the transaction to an account holder identifier.

The marketing campaign application 210 may also include providing the merchant with management options and reporting options. In various embodiments and with reference to FIG. 15, the marketing campaign application 210 can provide a merchant with a management dashboard for presenting information related to the merchant's offers. As illustrated, a merchant may have multiple offers, with each campaign having specific parameters and statuses. In various embodiments, the merchant can control the status of the offers varying from live, pending, cancelled, and completed.

Figure 16:
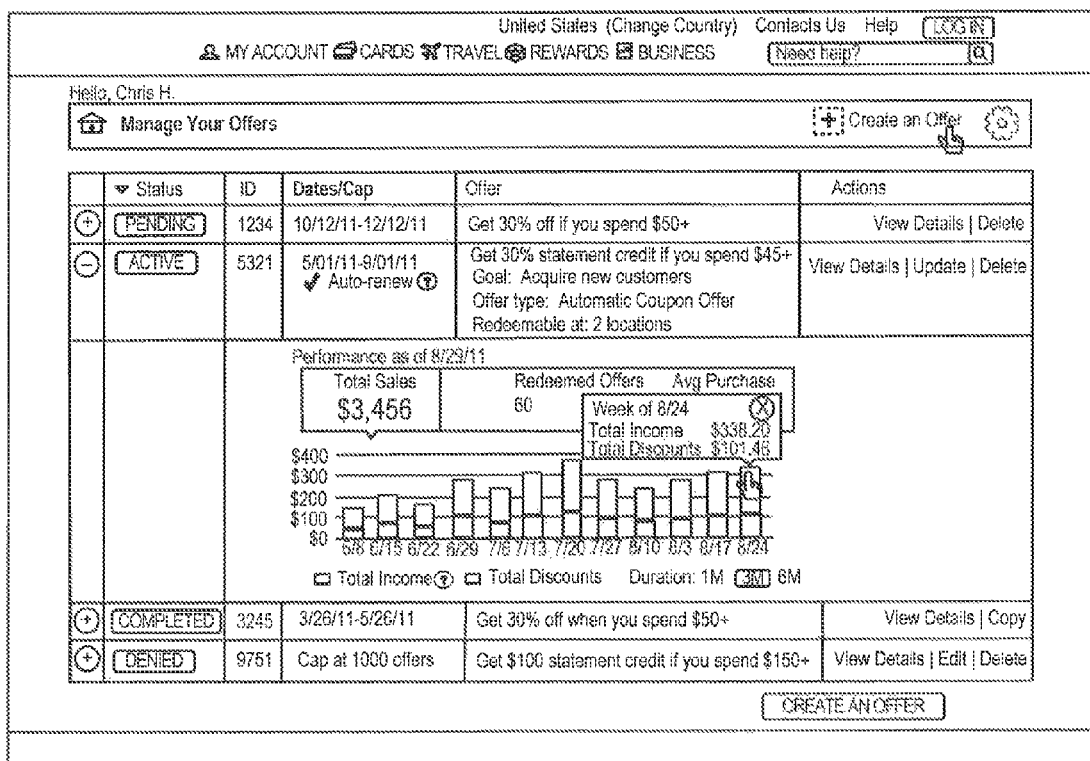
FIG. 16 illustrates an exemplary screenshot of a reporting function of a marketing campaign application, in accordance with various embodiments.

The reporting options may include a marketing analysis or monitoring of the success of various marketing programs and information relating to account holder participation therein. In various embodiments and with reference to FIG. 16, in addition to generating an offer, the system and method may further include reporting various metrics of the offer to the merchant or other entity. For example, the report may be provided to an entity that selects the offer parameters. In various embodiments, the systems and methods may include associating a transaction account of the account holder with the offer, monitoring a transaction of the transaction account, comparing the transaction with a criterion governing the offer, and generating a report for the merchant based on the transaction and account holder information. Reporting information may include a daily, weekly, monthly or other periodic breakdown of the total sales and total discounts generated by an offer. This information can help the merchant track the trends of the offer, such as whether the total sales are increasing or decreasing over time. In addition, the reporting information may include tracking information on the number of repeat customers and new customers during an offer period. Furthermore, in various embodiments, the report generating may occur during any time period, and in various embodiments in approximately real-time with the transaction. One advantage of approximately real-time report generation is the ability to modify the offer based on the reporting data.

In various embodiments, a reporting method may include associating, by a computer-based system, a transaction account of an account holder with an offer, monitoring a transaction of the transaction account, comparing the transaction with a criterion governing the offer, and generating a report for a merchant based on the transaction and account holder information. The generated report may include several types of analysis and information for the merchant. For example, reporting information in the report may include at least one of number of offers transmitted, number of offers accepted, number of offers redeemed, total value of redeemed offers, average size of transaction involving the offer, and rate of offer redemption.

In various embodiments, the reporting information in the report may include a return on investment or performance information. The return on investment is based on a comparison of transactions during an offer period and transactions during a non-offer period. This metric may be calculated in multiple ways. For instance, the metric could compare all of the transactions in an "offer" period to all of the transactions in a "non-offer" period. The metric may also determine whether an account holder or user spent a minimum amount to receive the offer or more than the minimum amount defined in the offer. These comparisons help capture the secondary effect of providing an offer to account holders, such as the effect of marketing the offer. Such comparisons could also be seasonally adjusted in order to obtain a more accurate understanding of an offers impact on business. Further, the reporting may separately analyze transactions making use of the offer versus transactions not making use of the offer.

In various embodiments, the reporting information in the report may include tracking information on the number of repeat customers and new customers during an offer period. The determination of whether a customer is a repeat customer or a new customer may be based on the transaction history of the account holder. When generating the report, a search of a transaction account number in a database having prior transactions is conducted. If a match is found, then the account holder is a repeat customer. If a match is not found, then the customer may be considered a new customer. Furthermore, in various embodiments a search for a merchant identifier in the account holder's transaction history database may be conducted. If the merchant identifier is located in the account holder's transaction history, then the customer may be considered a repeat customer of the merchant. If the merchant identifier is not found, then the customer may be considered a new customer of the merchant.

In various embodiments, the reporting information in the report may include non-transaction information, and the non-transaction information may include at least one of demographic information of the account holder and social media indicators. With respect to demographic information, the report may contain information such as age, gender, ethnicity, nationality, income, marital status, disabilities, mobility, home ownership, employment status, and location. The demographic information may be obtained directly from the account holder or may be obtained from an account holder database. The demographic information can be useful to a merchant to validate whether an offer directed towards a specific demographic is yielding results. The demographic information may aid a merchant in selecting a specific demographic to target in an offer.

With respect to social media indicators, in various embodiments, the report may contain information such as the number of "likes", "shares", or any other indication given by an account holder to a social media network of a response to the offer.

If the marketing campaign system has access to both the account holder information and the transaction information, the system is able to obtain data on both the customer account and the merchant transaction. In various embodiments, the marketing campaign system is configured to access the transaction information and account holder information in approximately real-time, and thereby generate the report approximately real-time with the transaction. In various embodiments, the transaction information and account holder information is accessed on a delayed time period, such as daily. Even if the reporting is not real-time, frequent offer reports still enable the merchant to receive timely status updates on the offer. The timely reports may enable the merchant to modify the current offer based on the reporting data. In accordance with various embodiments, marketing campaign application 210 comprises an application programming interface (API) configured to retrieve transaction data in approximately real-time to the occurrence of a transaction. The transaction data is inputted into marketing campaign application 210 and enables reporting on the performance of the current offer, and overall campaign performance may influence changes to the current campaign or to a future offer.

In various embodiments, a marketing campaign system has limited access to merchant and account holder data. A marketing campaign reporting method may include receiving, from a financial institution, batch data on multiple transactions. The marketing campaign reporting method includes filtering the batch data for a transaction at the merchant and account holder information associated with the transaction, comparing the transaction with a criterion governing an offer, and generating a report for the merchant based on the transaction and the account holder information. The reporting information in the report may include at least one of number of offers transmitted, number of offers accepted, number of offers redeemed, total value of redeemed offers, average size of transaction involving the offer, and rate of offer redemption. Further, the reporting information in the report may include a return on investment, wherein the return on investment is based on a comparison of transactions during an offer period and transactions during a non-offer period. Further, the reporting information in the report may include non-transaction information, wherein the non-transaction information includes at least one of demographic information of the account holder and social media indicators In various embodiments where the marketing campaign system receives batch data on multiple transactions from a financial institution and filters for a transaction at the merchant and account holder information associated with the transaction, the batch data may not be received in approximately real-time. Even if the batch data is received after an offer is completed, a second offer may be generated based on the batch data.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers, similar devices, or special purpose machines.

Figure 17:
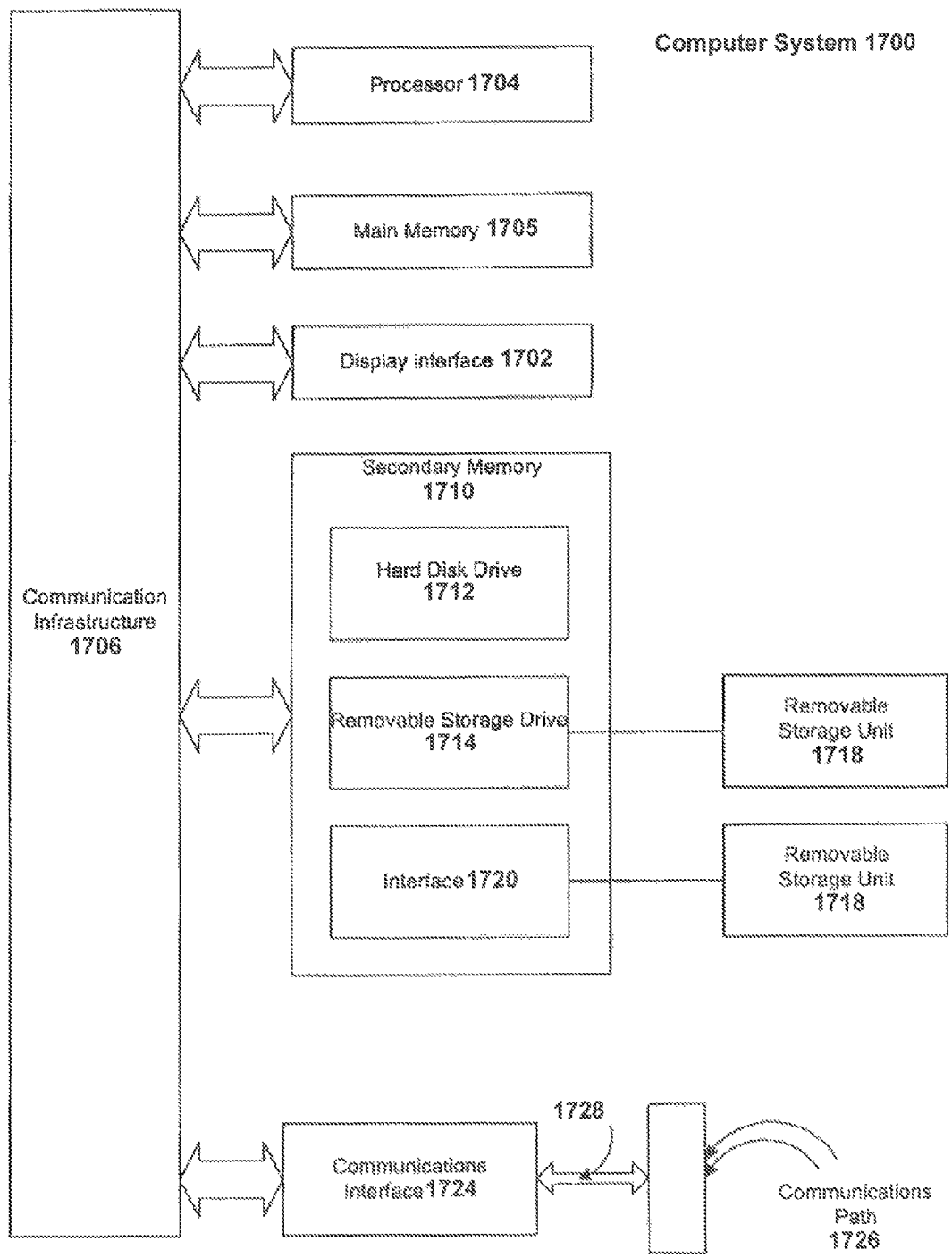
FIG. 17 illustrates a block diagram of an exemplary computer system used for implementing various embodiments.

In fact, in various embodiments, the embodiments are directed toward one or more computer systems capable of carrying out the functionality described herein. An example of a computer system 1700 is shown in FIG. 17.

The computer system 1700 includes one or more processors, such as processor 1704. The processor 1704 is connected to a communication infrastructure 1706 (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures.

Computer system 1700 can include a display interface 1702 that forwards graphics, text, and other data from the communication infrastructure 1706 (or from a frame buffer not shown) for display on a display unit.

Computer system 1700 also includes a main memory 1705, such as for example random access memory (RAM), and may also include a secondary memory 1710. The secondary memory 1710 may include, for example, a hard disk drive 1712 and/or a removable storage drive 1714, representing a floppy disk drive, a magnetic tape drive, an optical disk drive, etc. The removable storage drive 1714 reads from and/or writes to a removable storage unit 1718 in a well known manner. Removable storage unit 1718 represents a floppy disk, magnetic tape, optical disk, etc. which is read by and written to by removable storage drive 1714. As will be appreciated, the removable storage unit 1718 includes a computer usable storage medium having stored therein computer software and/or data.

In various embodiments, secondary memory 1710 may include other similar devices for allowing computer programs or other instructions to be loaded into computer system 1700. Such devices may include, for example, a removable storage unit 1718 and an interface 1720. Examples of such may include a program cartridge and cartridge interface (such as that found in video game devices), a removable memory chip (such as an erasable programmable read only memory (EPROM), or programmable read only memory (PROM)) and associated socket, and other removable storage units 1718 and interfaces 1720, which allow software and data to be transferred from the removable storage unit 1718 to computer system 1700.

Computer system 1700 may also include a communications interface 1724. Communications interface 1724 allows software and data to be transferred between computer system 1700 and external devices. Examples of communications interface 1724 may include a modem, a network interface (such as an Ethernet card), a communications port, a Personal Computer Memory Card International Association (PCMCIA) slot and card, etc. Software and data transferred via communications interface 1724 are in the form of signals 1728 which may be electronic, electromagnetic, optical or other signals capable of being received by communications interface 1724. These signals 1728 are provided to communications interface 1724 via a communications path (e.g., channel) 1726. This channel 1726 carries signals 1728 and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive 1714 and a hard disk installed in hard disk drive 1712. These computer program products provide software to computer system 1700.

Computer programs (also referred to as computer control logic) are stored in main memory 1705 and/or secondary memory 1710. Computer programs may also be received via communications interface 1724. Such computer programs, when executed, enable the computer system 1700 to perform the features as discussed herein. In particular, the computer programs, when executed, enable the processor 1704 to perform the features of various embodiments. Accordingly, such computer programs represent controllers of the computer system 1700.

In various embodiments, software may be stored in a computer program product and loaded into computer system 1700 using removable storage drive 1714, hard disk drive 1712 or communications interface 1724. The control logic (software), when executed by the processor 1704, causes the processor 1704 to perform the functions of various embodiments as described herein.

In various embodiments, hardware components are included such as application specific integrated circuits (ASICs). Implementation of the hardware so as to perform the functions described herein will be apparent to persons skilled in the relevant art(s).

One skilled in the art will appreciate that system 1700 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables may be the same or of the same type. However, data tables having similar, though not identical, data in the key fields may also be linked by using AGREP, for example. Any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 1700 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 1700, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand-alone device, the appropriate option for the action to be taken. System 1700 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 1700 may consist of any combination thereof at a single location or at multiple locations, wherein each database or system 1700 includes any of various suitable security features, such as firewalls, access codes, encryption, decryption, compression, decompression, and/or the like.

In addition to those described herein, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor, and a plurality of databases. Various databases used herein may include: client data; merchant data; financial institution data; and/or like data useful in the operation of the present system. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

The phrases account holder or cardmember may include any person, entity, government organization, business, machine associated with a transaction account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

In various embodiments, components, modules, and/or engines of system 100 may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The disclosure may be described herein in terms of functional block components, screen shots, optional selections and various processing steps. It should be appreciated that such functional blocks may be realized by any number of hardware and/or software components configured to perform the specified functions. For example, system 1700 may employ various integrated circuit components, e.g., memory elements, processing elements, logic elements, lookup tables, and/or the like, which may carry out a variety of functions under the control of one or more microprocessors or other control devices. Similarly, the software elements of system 1700 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 1700 may employ any number of conventional techniques for data transmission, signaling, data processing, network control, and/or the like. Still further, system 1700 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Phrases and terms similar to "business", "merchant", "supplier" or "seller" may be used interchangeably with each other and shall mean any person, entity, distributor, system, software and/or hardware. The merchant may be a provider, broker and/or any other entity in the distribution chain of goods or services and/or that receives payment or other consideration. For example, a merchant may be a grocery store, a retail store, a travel agency, a service provider, an on-line merchant or the like. For example, a supplier may request payment for goods sold to a buyer who holds an account with a transaction account issuer.

The terms "user," "end user," "consumer," "customer," "participant," and/or the plural form of these terms are used interchangeably throughout herein to refer to those persons or entities capable of accessing, using, being affected by and/or benefiting from the tool that the present disclosure provides for the rewards program described herein. This includes both individual consumers and corporate customers such as, for example, small businesses.

Phrases and terms similar to an "item" may include any good, service, information, experience, reward, points, coupons, credits, monetary equivalent, anything of value, something of minimal or no value, etc.

Phrases and terms similar to "financial institution," "transaction account issuer," "issuer", and "payment processor" may be used interchangeably and include any person, entity, software and/or hardware that offers transaction account services. For example, a payment processor may include an issuer and/or an acquirer. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution. Phrases or terms similar to a "processor" (such as a payment processor) may include a company (e.g., a third party institution) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "distribution channel" may include transmitting data using various methods and applications using any suitable communication channels. As used herein, "transmit" may include sending electronic data from one system component to another over a network connection. Additionally, as used herein, "data" may include encompassing information such as commands, queries, files, data for storage, and the like in digital or any other form.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

The invention claimed is:

1. A method comprising:
presenting, by a computer-based system and via a marketing campaign application, a merchant account dashboard to a merchant system of a merchant,
wherein the merchant account dashboard includes a social network set up tab with selectable links that are configured to link the marketing campaign application with a selected social network, and
wherein the marketing campaign application is configured to graphically present user selectable offer information, and
wherein the merchant system is operated by at least one of a transaction processor, a transaction account issuer, or a reward program provider;
receiving, by the computer-based system and at the merchant account dashboard, a selection of a first social media channel;
requesting, by the computer-based system and by the merchant campaign application, first authentication information for the first social media channel;
linking, by the computer-based system, the first social media channel with the merchant campaign application;
linking, by the computer-based system, a second social media channel in response to receiving a selection of the second social media channel and second authentication information;
receiving, at a computer-based system, offer parameters for generating a first offer and a second offer,
wherein the offer parameters include a first offer type, and merchant data for the first offer and a second offer type and merchant data for the second offer;
storing, by the computer-based system, the offer parameters in a database, wherein the storing includes using a binary large object method to store different data sets from different merchants with different formats as ungrouped data elements via a fixed memory offset;
storing, by the computer-based system, the offer parameters in the database by annotating the offer parameters with a header, trailer or indicator to convey information for managing the offer parameters;
annotating, by the computer-based system, the binary large object with a security access level;
providing, by the computer-based system, based on the security access level, access for the merchant to the offer parameters;
determining, by the computer-based system, offer data for the first offer and the second offer based on the offer parameters and account holder data;
determining, by the computer-based system, a first electronic distribution channel for the first offer based on the first offer type and the offer parameters
wherein the first electronic distribution channel is the first social media channel that is configured to broadcast text and images,
creating, by the computer-based system, an opt-in criteria for the offer based on the first social media channel;
generating, by the computer-based system and in response to the determining the first electronic distribution channel, the first offer in a first offer format for distribution,
wherein the first offer format is customized for and defined by parameters of the first electronic distribution channel, and
wherein the first offer includes the opt-in criteria as a point of interaction with the first offer,
wherein the first offer includes hyperlinks customized for operation in the first electronic distribution channel;
generating, by the computer-based system and based on the opt-in criteria, a software-enabled and user selectable opt-in button to associate with the first offer;
determining, by the computer-based system, a second electronic distribution channel for the second offer based on the second offer type and the offer parameters
wherein the second electronic distribution channel is the second social media channel that is configured to broadcast text; and
generating, by the computer-based system and in response to the determining the second electronic distribution channel, the second offer in a second offer format for distribution,
wherein the second offer format is customized for and defined by parameters of the second electronic distribution channel,
wherein the second offer includes hyperlinks customized for operation in the second electronic distribution channel.

2. The method of claim 1, further comprising receiving, by the computer-based system, a selection of at least one merchant location for redemption of the offer.

3. The method of claim 1, wherein the offer parameters are provided based on a business objective, and wherein the business objective is at least one of acquisition of new customers, and loyalty of prior customers.

4. The method of claim 3, wherein the computer-based system provides offer parameter guidelines based on the business objective.

5. The method of claim 1, further comprising:
matching, by the computer-based system, an accepted offer with a record of charge (ROC) in a transaction account held by the account holder; and
crediting, by the computer-based system, the transaction account based upon the matching.

6. The method of claim 5, further comprising debiting, by the computer-based system, a transaction account held by a merchant in response to the crediting.

7. The method of claim 1, wherein the account holder is selected, by the computer-based system, based on account history, and wherein the account history comprises at least one of prior transaction data, loyalty points, reward points, location of prior transactions, past purchases, transaction amount, transaction volume, or account status, and wherein each of the prior transaction data, past purchases, transaction amount and transaction volume is associated with a financial transaction.

8. The method of claim 1, wherein the account holder is selected based on at least one of demographics or a location of the account holder.

9. The method of claim 1, further comprising determining, by the computer-based system, a location of the account holder based upon at least one of: a zip code, a GPS signal, a location signal or a submitted location by the account holder.

10. The method of claim 1, wherein the offer parameters are received from a merchant.

11. The method of claim 1, further comprising:
associating, by the computer-based system, a transaction account of the account holder with at least one of the first offer or the second offer;
monitoring, by the computer-based system, a transaction of the transaction account;
comparing, by the computer-based system, the transaction with a criterion governing at least one of the first offer or the second offer; and
generating, by the computer-based system, a report based on the transaction and account holder data.

12. The method of claim 11, further comprising providing, by the computer-based system, the report to an entity that provides the offer parameters.

13. The method of claim 11, wherein reporting information in the report includes at least one of number of the offers transmitted, number of the offers accepted, number of the offers redeemed, total value of the redeemed offers, average size of the transaction involving the offer, or rate of the offer redemption.

14. The method of claim 11, wherein reporting information in the report includes a return on investment, wherein the return on investment is based on a comparison of the first transactions during an offer period and second transactions during a non-offer period.

15. The method of claim 11, wherein reporting information in the report includes non-transaction information, and wherein the non-transaction information includes at least one of demographic information of the account holder or social media indicators.

16. The method of claim 11, wherein reporting information in the report includes tracking information on repeat customers and new customers during an offer period.

17. The method of claim 11, wherein the marketing campaign application comprises an application programming interface (API) configured to retrieve transaction data in approximately real-time to the occurrence of the transaction, and wherein the generating the report occurs in real-time with the transaction and in response to the transaction being initiated.

18. The method of claim 17, further comprising at least one of generating a second marketing campaign or modifying the offer based on reporting information in the report.

19. An article of manufacture including a non-transitory, tangible computer readable storage medium having instructions stored thereon that, in response to execution by a computer-based system, cause the computer-based system to perform operations comprising:
   presenting, by the computer-based system and via a marketing campaign application, a merchant account dashboard to a merchant system of a merchant,
      wherein the merchant account dashboard includes a social network set up tab with selectable links that are configured to link the marketing campaign application with a selected social network, and
      wherein the marketing campaign application is configured to graphically present user selectable offer information, and
      wherein the merchant system is operated by at least one of a transaction processor, a transaction account issuer, or a reward program provider;
   receiving, by the computer-based system and at the merchant account dashboard, a selection of a first social media channel;
   requesting, by the computer-based system and by the merchant campaign application, first authentication information for the first social media channel;
   linking, by the computer-based system, the first social media channel with the merchant campaign application;
   linking, by the computer-based system, a second social media channel in response to receiving a selection of the second social media channel and second authentication information;
   receiving, at a computer-based system, offer parameters for generating a first offer and a second offer,
      wherein the offer parameters include a first offer type, and merchant data for the first offer and a second offer type and merchant data for the second offer;
   storing, by the computer-based system, the offer parameters in a database, wherein the storing includes using a binary large object method to store different data sets from different merchants with different formats as ungrouped data elements via a fixed memory offset;
   storing, by the computer-based system, the offer parameters in the database by annotating the offer parameters with a header, trailer or indicator to convey information for managing the offer parameters;
   annotating, by the computer-based system, the binary large object with a security access level;
   providing, by the computer-based system, based on the security access level, access for the merchant to the offer parameters;
   determining, by the computer-based system, offer data for the first offer and the second offer based on the offer parameters and account holder data;
   determining, by the computer-based system, a first electronic distribution channel for the first offer based on the first offer type and the offer parameters
      wherein the first electronic distribution channel is the first social media channel that is configured to broadcast text and images,
   creating, by the computer-based system, an opt-in criteria for the offer based on the first social media channel;
   generating, by the computer-based system and in response to the determining the first electronic distribution channel, the first offer in a first offer format for distribution,
      wherein the first offer format is customized for and defined by parameters of the first electronic distribution channel, and
      wherein the first offer includes the opt-in criteria as a point of interaction with the first offer,
      wherein the first offer includes hyperlinks customized for operation in the first electronic distribution channel;
   generating, by the computer-based system and based on the opt-in criteria, a software-enabled and user selectable opt-in button to associate with the first offer;
   determining, by the computer-based system, a second electronic distribution channel for the second offer based on the second offer type and the offer parameters
      wherein the second electronic distribution channel is the second social media channel that is configured to broadcast text; and
   generating, by the computer-based system and in response to the determining the second electronic distribution channel, the second offer in a second offer format for distribution,
      wherein the second offer format is customized for and defined by parameters of the second electronic distribution channel,
      wherein the second offer includes hyperlinks customized for operation in the second electronic distribution channel.

20. A system comprising:
   a processor,
   a tangible, non-transitory memory configured to communicate with the processor,
   the tangible, non-transitory memory having instructions stored thereon that, in response to execution by the processor, cause the processor to perform operations comprising:

presenting, by the processor and via a marketing campaign application, a merchant account dashboard to a merchant system of a merchant,
- wherein the merchant account dashboard includes a social network set up tab with selectable links that are configured to link the marketing campaign application with a selected social network, and
- wherein the marketing campaign application is configured to graphically present user selectable offer information, and
- wherein the merchant system is operated by at least one of a transaction processor, a transaction account issuer, or a reward program provider;

receiving, by the processor and at the merchant account dashboard, a selection of a first social media channel;

requesting, by the processor and by the merchant campaign application, first authentication information for the first social media channel;

linking, by the processor, the first social media channel with the merchant campaign application;

linking, by the processor, a second social media channel in response to receiving a selection of the second social media channel and second authentication information;

receiving, at a processor, offer parameters for generating a first offer and a second offer,
- wherein the offer parameters include a first offer type, and merchant data for the first offer and a second offer type and merchant data for the second offer;

storing, by the processor, the offer parameters in a database, wherein the storing includes using a binary large object method to store different data sets from different merchants with different formats as ungrouped data elements via a fixed memory offset;

storing, by the processor, the offer parameters in the database by annotating the offer parameters with a header, trailer or indicator to convey information for managing the offer parameters;

annotating, by the processor, the binary large object with a security access level;

providing, by the processor, based on the security access level, access for the merchant to the offer parameters;

determining, by the processor, offer data for the first offer and the second offer based on the offer parameters and account holder data;

determining, by the processor, a first electronic distribution channel for the first offer based on the first offer type and the offer parameters
- wherein the first electronic distribution channel is the first social media channel that is configured to broadcast text and images, creating, by the processor, an opt-in criteria for the offer based on the first social media channel;

generating, by the processor and in response to the determining the first electronic distribution channel, the first offer in a first offer format for distribution,
- wherein the first offer format is customized for and defined by parameters of the first electronic distribution channel, and
- wherein the first offer includes the opt-in criteria as a point of interaction with the first offer,
- wherein the first offer includes hyperlinks customized for operation in the first electronic distribution channel;

generating, by the processor and based on the opt-in criteria, a software-enabled and user selectable opt-in button to associate with the first offer;

determining, by the processor, a second electronic distribution channel for the second offer based on the second offer type and the offer parameters
- wherein the second electronic distribution channel is the second social media channel that is configured to broadcast text; and generating, by the processor and in response to the determining the second electronic distribution channel, the second offer in a second offer format for distribution,
- wherein the second offer format is customized for and defined by parameters of the second electronic distribution channel,
- wherein the second offer includes hyperlinks customized for operation in the second electronic distribution channel.

* * * * *